United States Patent [19]

Albrecht

[11] Patent Number: 5,615,394
[45] Date of Patent: Mar. 25, 1997

[54] ANAMORPHIC LENS FOR A PHOTOGRAPHIC FLASH ASSEMBLY

[75] Inventor: Richard E. Albrecht, Honeoye Falls, N.Y.

[73] Assignee: Eastman Kodak Company, Rochester, N.Y.

[21] Appl. No.: 330,637

[22] Filed: Oct. 28, 1994

Related U.S. Application Data

[63] Continuation-in-part of Ser. No. 327,089, Oct. 21, 1994, abandoned, which is a continuation-in-part of Ser. No. 264,392, Jun. 23, 1994, abandoned.

[51] Int. Cl.$^6$ ................................................ G03B 15/03
[52] U.S. Cl. ............................ 396/6; 396/176; 396/541
[58] Field of Search ........................ 354/149.11, 174, 354/275, 288; 362/16, 17, 18, 244, 245

[56] References Cited

U.S. PATENT DOCUMENTS

| | | |
|---|---|---|
| 2,428,399 | 10/1947 | Timoney ................................... 88/57 |
| 2,933,027 | 4/1960 | Hollingworth et al. . |
| 3,720,145 | 3/1973 | Johnson et al. . |
| 3,731,586 | 5/1973 | Meazza . |
| 4,017,727 | 4/1977 | Yamamoto . |
| 4,234,906 | 11/1980 | Schindler . |
| 4,356,538 | 10/1982 | Plummer . |
| 4,462,063 | 7/1984 | English . |
| 4,616,294 | 10/1986 | Tenmyo . |
| 4,702,581 | 10/1987 | Yamada et al. . |
| 4,804,987 | 2/1989 | Arai . |
| 4,812,863 | 3/1989 | Ohmura et al. . |
| 4,812,866 | 3/1989 | Ushiro et al. . |
| 4,855,774 | 8/1989 | Ohmura et al. . |
| 4,884,087 | 11/1989 | Mochida et al. . |
| 4,890,130 | 12/1989 | Takei et al. . |
| 5,021,811 | 6/1991 | Maurinus et al. . |
| 5,055,976 | 10/1991 | Arai . |
| 5,146,255 | 9/1992 | Nakai et al. . |
| 5,160,192 | 11/1992 | Sugawara . |
| 5,170,199 | 12/1992 | Nakai et al. . |
| 5,255,041 | 10/1993 | Lyon et al. . |
| 5,315,332 | 5/1994 | Hirasaki et al. ................. 354/149.11 |
| 5,329,330 | 7/1994 | Sakai et al. . |
| 5,353,165 | 10/1994 | VanDeMoere et al. . |

FOREIGN PATENT DOCUMENTS

| | | |
|---|---|---|
| 3925916A1 | 7/1990 | Germany . |
| 59-228221 | 12/1984 | Japan . |

OTHER PUBLICATIONS

IBM Technical Disclosure Bulletin, vol. 27, No. 2, Jul. 1984, New York, US p. 1213 Tag Reader Optics–Cylindrical Lens.

Primary Examiner—David M. Gray
Attorney, Agent, or Firm—Peter J. Bilinski

[57] ABSTRACT

An anamorphic lens (10) having a first surface (14) which has either a cylindrical or an acylindrical radius of curvature, and a second surface (16) having either a cylindrical or an acylindrical radius of curvature. Each surface has a primary longitudinal axis (22, 24,) which is preferably but not necessarily orthogonal to the optical axis (18) of the lens (10); and the longitudinal axes are crossed. Preferred applications for the anamorphic lens include non-image forming illumination systems wherein independent illumination control in two coplanar directions at the object is desired. A process for recycling a single use camera having such an anamorphic lens is also disclosed.

40 Claims, 9 Drawing Sheets

FIG. 8 ILLUMINATION (LUX)

FIG. 9 ILLUMINATION (LUX)

ANAMORPHIC LENS FOR A PHOTOGRAPHIC FLASH ASSEMBLY

CROSS-REFERENCE TO RELATED APPLICATIONS

This is a continuation-in-part of U.S. patent application Ser. No. 08/327,089 filed Oct. 21, 1994 which is a continuation-in-part of U.S. patent application Ser. No. 08/264,392, filed Jun. 23, 1994, both now abandoned.

The ornamental aspects of features of the single use camera illustrated in FIGS. 10–14 are subjects of the following copending design applications commonly assigned with the present application: Flash Camera with Cover Label, Ser. No. 29/027/928, Flash Camera, Ser. No. 29/027, 930; Cover Label for Flash Camera, Ser. No. 29/027,933, [Docket No., all of which were filed on Sep. 1, 1994; and Rear Cover of Flash Camera, Ser. No. 08/327,250, filed on Oct. 21, 1994. Other features of the single use camera illustrated in FIGS. 10–14 are subjects of the following utility applications commonly assigned with the present application and filed simultaneously herewith: Single Touch Flash Charger Control, Ser. No. 08/330,658, and One Piece Viewfinder And Fabrication Process, Ser. No. 08/330,572 filed Oct. 28, 1994.

BACKGROUND OF THE INVENTION

1. Field of the Invention

This invention relates generally to anamorphic lenses, and more particularly to an anamorphic lens having a cylindrical and/or an acylindrical surface, and to an improved photographic camera flash assembly incorporating an anamorphic lens having a cylindrical and/or an acylindrical surface for providing independent illumination control at a target.

2. Description of the Related Art

Illumination assemblies for flash systems of currently popular photographic cameras comprise a trough-type reflector which surrounds a long, slender Xenon flash tube, and a transparent front cover to isolate the flash tube and reflector from physical contact. Front covers typically have optical power to improve the distribution of flash illumination in the object scene being photographed, and thus the front cover can be regarded as a lens.

Sugawara, U.S. Pat. No. 5,160,192, for example, describes an illuminating instrument for decreasing light distribution nonuniformity at an object scene, composed of a multi-ellipsoid reflector, a light source, and a condenser which concentrates light from the flash burst in an object scene. The condenser has an effective convex cylindrical Fresnel lens rear surface in which the Fresnel grooves are perpendicular to the longitudinal axis of the flash tube and a concentric, convex Fresnel front lens surface.

English, U.S. Pat. No. 4,462,063, describes a photo flash assembly which includes an aspheric lens to enhance light output and scene illumination. The aspheric lens has a convexly curving outward surface of either spherical or aspherical shape and a spherical rear, inner surface.

The spherical lens surfaces described by English and Sugawara have the potential to condense object scene illumination in an infinite number of radial directions due to their radial symmetry, while the use of a cylindrical surface, as described by Sugawara, can improve the illumination profile in one direction, for instance, the horizontal or the vertical direction, but the corresponding orthogonal direction is unaffected. Because photographic flash light sources are typically elongate, the use of spherical and cylindrical optical power, separately or in combination, to improve scene illumination, is a compromise attempt to control the illumination distribution in independent, typically orthogonal, directions. To this end, the inventor has recognized a need for an anamorphic lens which is suitable for use in a photo flash assembly, for example, to provide independent illumination control in an object scene in two directions.

Furthermore, as camera flash assemblies get smaller to keep pace with decreasing camera size, flash optical systems require correspondingly shorter focal lengths, and smaller f/#'s, to maintain high picture taking quality. As f/#'s decrease, however, it becomes more difficult to coordinate the destination of light which passes through the edge zone of the lens and the center zone of the lens for the desired object scene illumination distribution, particularly when the lens surface is a cylinder of constant radius. Thus, there is a need to vary the optical power of the lens from the center to the edge zones in order to exercise the necessary control over the scene illumination distribution. To this end, the invention describes an acylindrical, anamorphic lens which has application in a photo flash assembly, for instance, to provide independent illumination control in an object scene in two directions.

SUMMARY OF THE INVENTION

An object of the invention is to provide an anamorphic lens having particular application to a photographic camera flash assembly including a reflector and illumination means, in which the lens comprises a first refracting surface having either a cylindrical or an acylindrical shape, and having a longitudinal axis; and a second refracting surface having either a cylindrical or an acylindrical shape, and a longitudinal axis, in which the longitudinal axes of both surfaces are crossed with respect to each other, for providing independent illumination control in at least two directions at a target or in a scene.

Another object of the invention is to provide an anamorphic lens having particular application to non-image forming illumination systems, such as photograph camera flash assemblies, and those used in copier, microfilm and other duplicating machine systems, for example, for providing independent illumination control in at least two directions transverse to the optical axis at a target.

A further object of the invention is to provide an acylindrical, anamorphic lens having particular application to fast non-image forming illumination systems, such as photograph camera flash assemblies in which the cover lens has an f/# less than or equal to about f/5, for providing more efficient illumination distribution control in an object scene. When at least one of the lens surfaces is acylindrical, for example, having a cylindrical, hyperbolic curvature with respect to the longitudinal axis of the surface, the radius of curvature of the cylinder increases with distance from the center zone to the edge zone of the lens, resulting in a refracting surface over the clear aperture of the lens which provides the desired illumination pattern in an object scene.

Another object of the invention is to provide a single use electronic flash camera that may incorporate previously used elements in a recycled camera, including a camera body having a film cassette chamber. The ability to recycle parts promotes the efficient use of scarce natural resources, saves space in landfills, and reduces the cost of camera. To this end, the camera body supports single use camera parts, including a flash device having a reflector at one end, an opening at another end, and an anamorphic lens mounted in the opening. The anamorphic lens includes means for providing independent illumination control in at least two directions. Many single use camera parts, including the anamorphic lens, may be recycled in any particular camera. An unexposed roll of film then is mounted in the film cassette chamber of the camera body.

Still another object of the invention is to provide a method of recycling a single use camera with an electronic flash by incorporating previously used single use camera parts comprising the steps of: providing a previously used camera body having a film cassette chamber; supporting in the camera body previously used single use camera parts, including a flash device having a reflector with a light source at one end, an opening at another end, and an anamorphic lens mounted in the opening, the lens including means for providing independent illumination control in at least two different directions; and loading an unexposed roll of film into the film cassette chamber of the camera body.

These and other objects and advantages of the invention will become more apparent from the attached Drawings and the Detailed Description of the Invention, which follow.

DETAILED DESCRIPTION OF THE INVENTION

As used herein, the term acylindrical includes a cross sectional surface contour which deviates slightly from the cross sectional spherical contour of a cylindrical lens, as understood by those skilled in the art. For example, the spherical contour may be deformed by a conic perturbation, such as having a hyperbolic, parabolic, ellipsoidal or other surface profile. That surface contour would then be acylindrical as defined. The meaning of acylindrical also encompasses a variation in the shape of the lens along the axis of the cylinder regardless of whether the cross sectional contour of the lens surface deviates from spherical.

Figure 1:
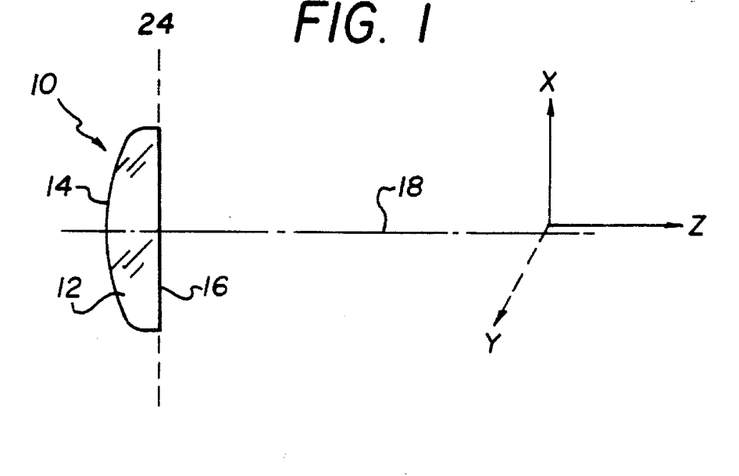
FIG. 1 is a top plan view in the x-z plane of an anamorphic lens having a first surface with either a cylindrical curvature or an acylindrical curvature normal to the plane of the paper (y-z plane) and a second surface with either a cylindrical curvature or an acylindrical curvature in the plane of the paper (x-z plane)
Figure 2:
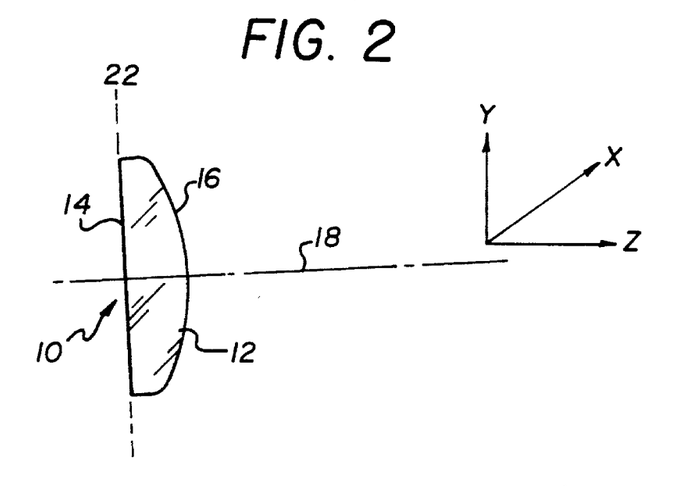
FIG. 2 is a side elevational view of the lens of FIG. 1 (y-z plane)

As shown in FIGS. 1 and 2, an anamorphic lens 10 is composed of a body of optical material 12 which has a first refracting surface 14 and a second refracting surface 16. Second surface 16 can be either cylindrical or cylindrically aspherical; i.e., acylindrical. An acylindrical curvature on surface 16 becomes especially desirable when the f/# of the surface approaches values of about f/5 and smaller. In those cases, a constant radius of curvature from the center zone to the edge zone of the lens typically results in light passing through the center zone being distributed to a different location relative to the optical axis than the light passing through the edge zone of the lens. The curvature at the edge zone can be decreased, or flattened, by making the surface curvature acylindrical; for example, by putting a conic figure such as that of a hyperbola on the surface.

In a preferred case, the first surface 14 has a longitudinal axis 22 which runs transverse to a plane of curvature of the lens surface, and which is preferably or typically orthogonal to the optical axis 18 of the lens. As shown in FIG. 2, the longitudinal axis 22 is parallel to the y-axis of the accompanying coordinate system and the curvature of first surface 14 lies in horizontal planes parallel to the x-z plane. The invention, however, places no restriction on the radial orientation of longitudinal axis 22 in the x-y plane, or to the orientation of optical axis 18.

Figure 5:
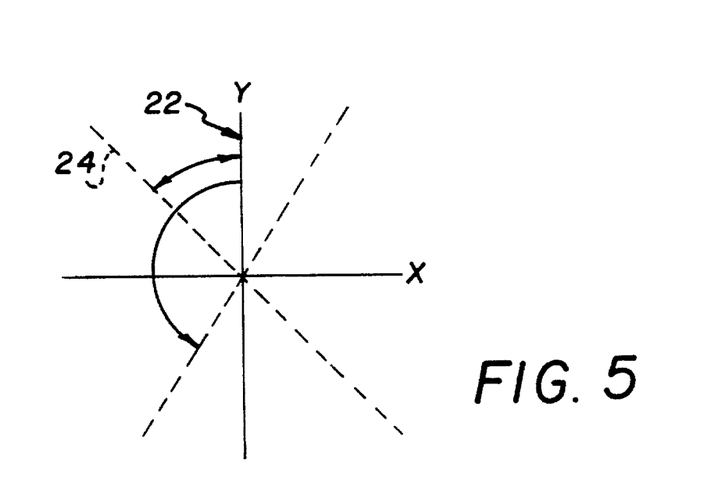
FIG. 5 is an elevational view in the x-y plane showing the range of orientations between the longitudinal axes of the first and second lens surfaces.

In like manner, the second surface 16 of lens 10 can also be either cylindrical or acylindrical for the same reason discussed for first surface 14; and second surface 16 likewise has a longitudinal axis 24, as shown in FIG. 1. Similar to longitudinal axis 22, axis 24 is preferably or typically orthogonal to optical axis 18. In a still preferred embodiment, the longitudinal axes 22 and 24 are mutually orthogonal; however, it is within the scope of the invention that the axes can be arbitrarily crossed in the x-y plane, thus giving the lens its anamorphic characteristic. As shown in FIG. 5, a useful range of angular orientations between the longitudinal axes of the first and second surfaces is between about 40 degrees to 140 degrees.

The cylindrical/acylindrical combination of surfaces 14, 16, is not restricted by the invention other than to allow the independent control of illumination in at least two coplanar directions transverse to the optical axis 18 to achieve the desired energy distribution in an object scene.

In one aspect of the invention, both lens surfaces 14, 16 are convex; i.e., the center of curvature of surface 14 lies to the right of the surface, and the center of curvature of surface 16 lies to the left of the surface. The invention, however, does not preclude the use of a concave or other surface curvature, depending upon the target illumination distribution that is desired. Examples of distribution profiles are shown in FIGS. 6–9, described in greater detail below.

In a particular embodiment, referred to herein as Example I, the lens 10 has a height d=12 mm.; the first surface 14 is cylindrical and has a radius of curvature $R_1$=60 mm.; the second surface 16 is acylindrical and has a SAG Z defined by $$Z = \frac{CY^2}{1 + [1 - (K+1)C^2Y^2]^{1/2}} + A_2Y^2 + A_4Y^4 \ldots + A_nY^n$$

where
C=1/$R_2$;
K=the conic constant of the acylinder, and =−5;
Y=distance out from the optical axis;
A=aspheric deformation constant; and
$R_2$ is the radius of curvature of surface 16 at the vertex, and =−18 mm.

Figure 6:
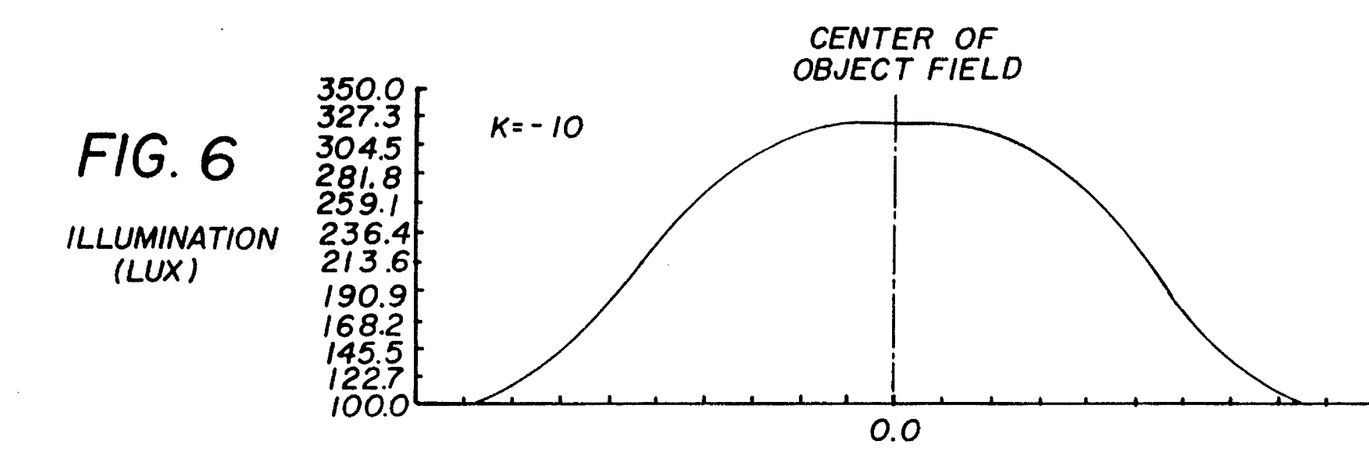
FIGS. 6, 7, 8 and 9 show comparative illumination distribution profiles between the top and bottom of the object field due to the lens of Example I when the conic constant of the acylindrical surface is K=−10, K=−5, K=0, and K=+2.5, respectively.
Figure 7:
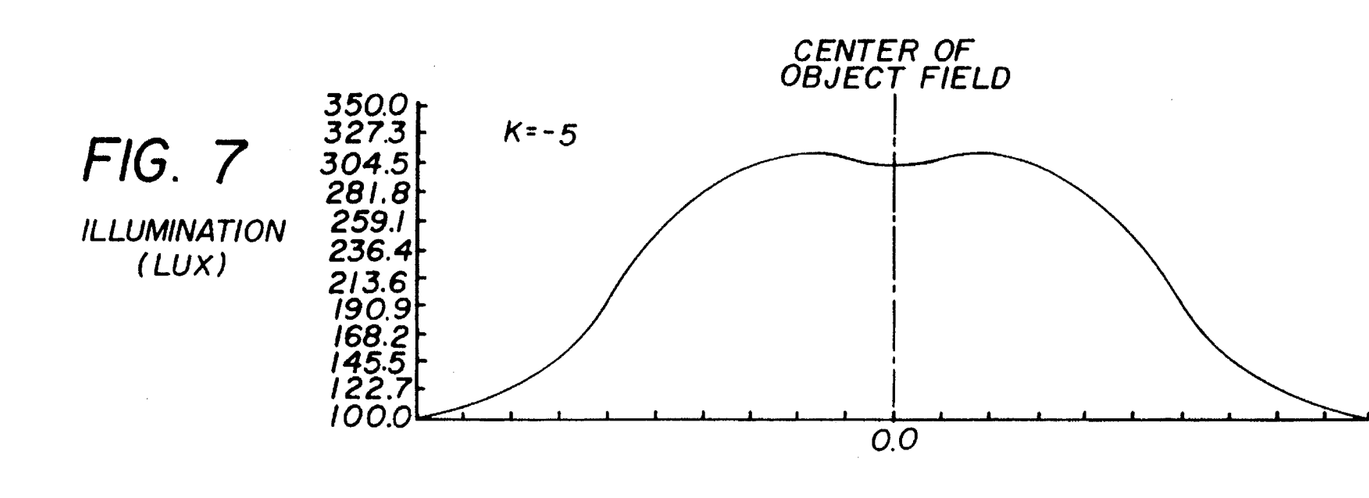
Figure 8:
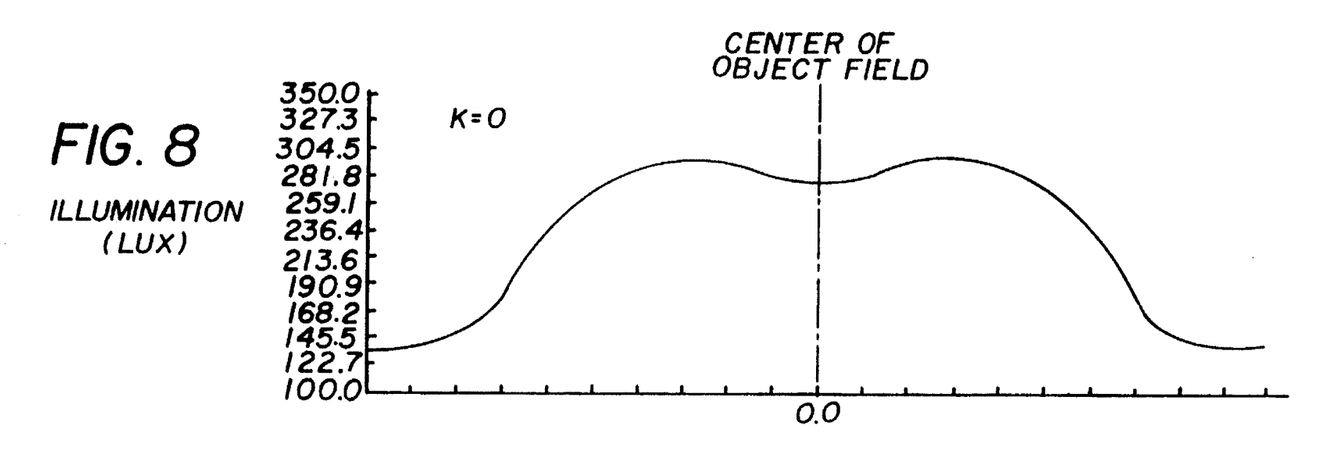
Figure 9:
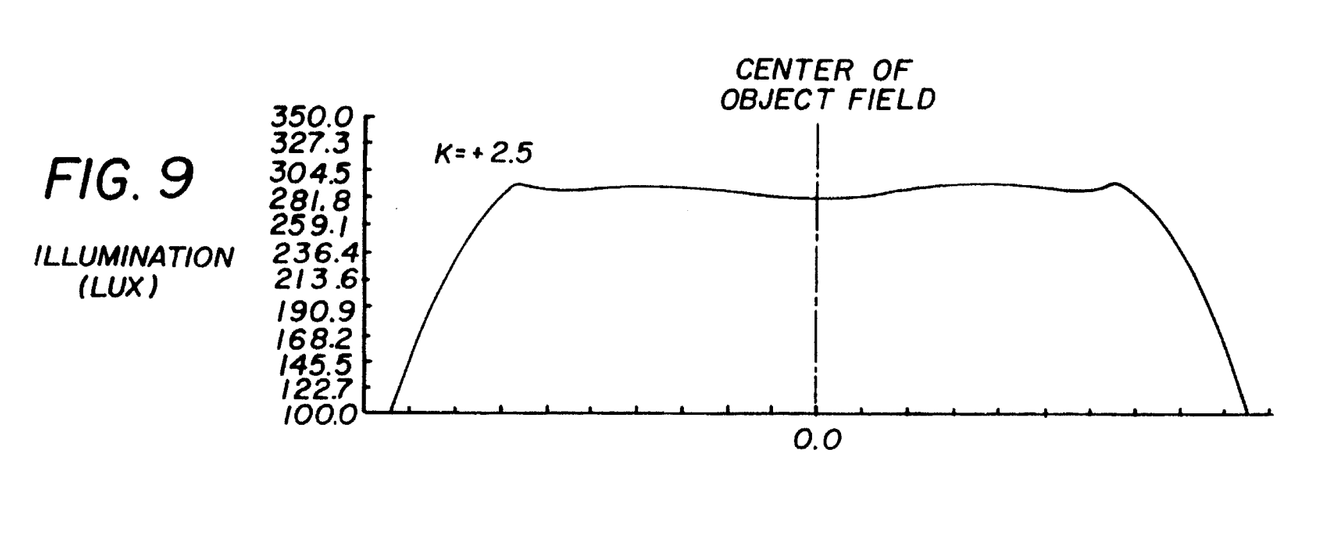

For illustrative purposes, comparative illumination distribution profiles in an object scene due to the acylindrical surface of the lens in Example I, are shown in FIGS. 6, 7, 8 and 9. FIG. 6 shows the illumination profile between the top and the bottom of the object field for the preferred embodiment lens of Example I; i.e., K=−10. The ordinate is a relative measure of distance from center to top and center to bottom in the x-y plane at z=object location, and the parallel lines along the abscissa indicate relative illumination levels measured in lux. The lux value along the ordinate represents the amount of light present at the corresponding point of the object field depicted along the abscissa, for the purpose of discussion. FIGS. 7, 8 and 9 show comparative data to that of FIG. 6 due to the lens of Example I with the sole exception that the conic constant was changed from K=−5 to K=0 and finally K=+2.5. As is noted in each of the referred to FIGS. 6, 7, 8 and 9, the illumination at the center of the optical field can be easily varied to produce greater illumination such as seen in FIG. 6, or to produce a more uniform distribution profile, such as in FIG. 9. Accordingly, illumination at the edges of the optical field can be comparably varied depending on the requirements of the particular optical system or application based on the variation in the conic constant.

The anamorphic lens described herein above has general application in any illumination system in which a particular target energy distribution is desired and achievable by independently controlling the illumination distribution in at least two directions transverse to the optical axis of the system. Further, the invention is particularly applicable to non-imaging illumination systems, such as a photographic camera flash assembly, for example, as shown in FIGS. 3 and 4 for use in a camera, such as a recyclable single-use camera, an example of which is shown in FIGS. 10–14.

Figure 3:
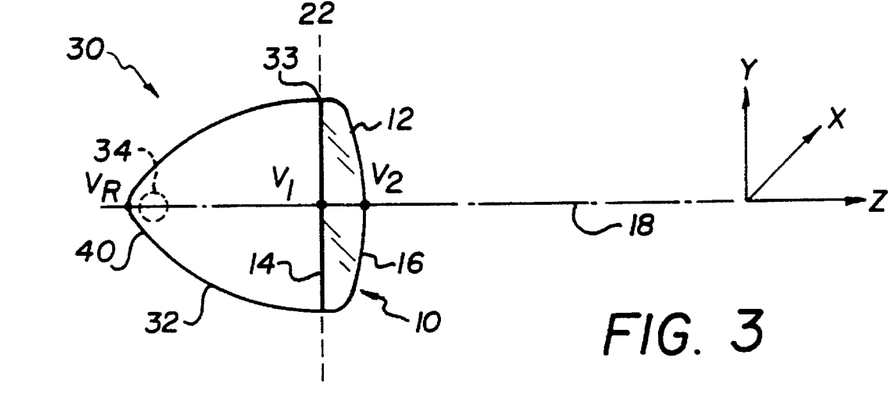
FIG. 3 is a left side elevational view of a photographic illumination assembly application of the invention showing a trough reflector, a flash lamp and an anamorphic lens having a cylindrical first surface curvature in the y-z plane and an acylindrical second surface curvature in the x-z plane.
Figure 4:
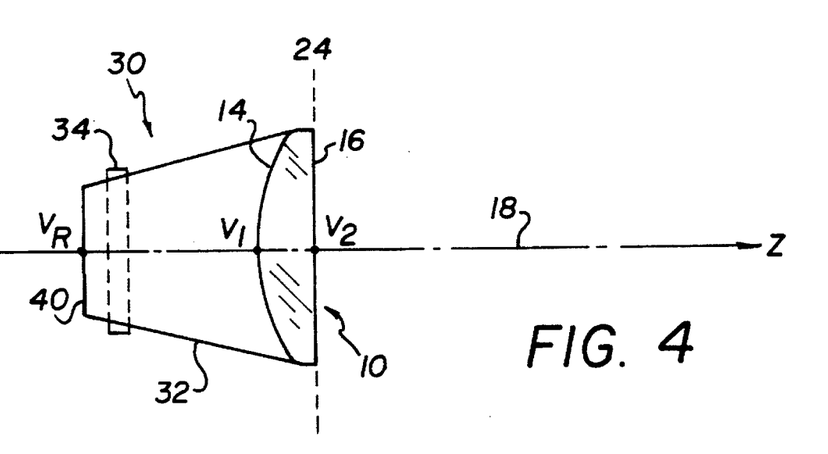
FIG. 4 is a top plan view of the photographic illumination assembly of FIG. 3.

An improved photographic camera illumination assembly 30, is shown in FIGS. 3 and 4, and comprises a reflector 32 which is generally trough shaped and having an open end 33 over which a lens/cover 10 is located; and a flash lamp 34 located near the back wall 40 of the reflector; the general characteristics of such a reflector assembly being well known to those skilled in the art. As contemplated by the invention, the lens component 10 of the flash assembly is identical to anamorphic lens 10 described herein above and thus like parts are referred to with the same reference numerals as in FIGS. 1 and 2, such as body of optical material 12.

In a general embodiment of the photo flash application, lens 10 is located over the open end 33 of a reflector 32 including a flash lamp 34. First lens surface 14 is cylindrical and has a longitudinal axis 22, FIG. 2. Second lens surface 16 is acylindrical and has a longitudinal axis oriented orthogonally to axis 24. The curvature of acylindrical surface 16 is defined by a SAG Z where $$Z = \frac{CY^2}{1 + [1 - (K+1)C^2Y^2]^{1/2}} + A_2Y^2 + A_4Y^4 \ldots + A_nY^n$$

where
C=1/$R_2$, surface curvature at vertex;
K=the conic constant of the acylinder;
Y=distance out from the optical axis;
A=aspheric deformation constant; and −7≦K≦−3 (approximately), and the f/# of surface 16 is ≦f/5 (approximately).

In a particular embodiment of the preferred photo flash application, lens 10 has the following parameters:
the first cylindrical surface 14 has a radius of curvature $R_1$=60 mm.; the second acylindrical surface 16 has a radius of curvature $R_2$=−18 mm. at vertex $V_2$ and a SAG Z defined by $$Z = \frac{CY^2}{1 + [1 - (K+1)C^2Y^2]^{1/2}} + A_2Y^2 + A_4Y^4 \ldots + A_nY^n$$

where
C=1$R_2$;
K=−5, the conic constant of the acylinder;
Y=distance out from the optical axis;
A=spheric deformation constant;
d=12 mm., the diameter of the lens; and the distance from $V_R$ to $V_1$ is about 9.4 mm. (where $V_R$ is the on-axis point of reflector back wall 40) and the distance from $V_1$ to $V_2$ is about 2.3 mm.

It will be appreciated by those persons of ordinary skill in the art, with respect to the photo flash application illustrated in FIGS. 3 and 4, that the contour of the reflective surface 35 of reflector 32 will impact the specific design parameters of lens 10 depending upon the illumination distribution desired in an object scene or target. Various ray tracing methods and other optical design methodologies which are well known to persons skilled in the art will dictate the appropriate performance related design parameters for the applications appropriate to the invention. Accordingly, the numerical example described above is merely exemplary of a particular application; whereas the invention covers a full range of non-image forming illumination assemblies comprising a reflector, illumination means, and an anamorphic lens as described herein.

Figure 2A:
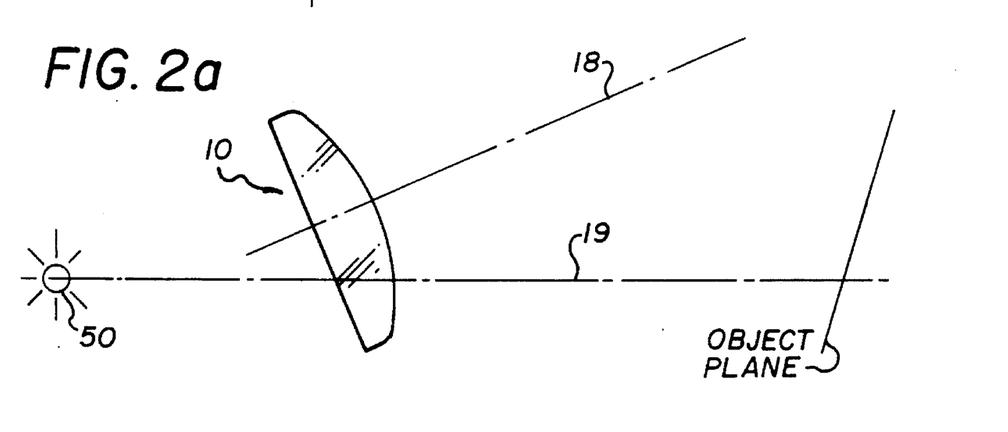
FIG. 2(a) is a side elevational view of the lens of FIG. 1 with respect to a system optical axis which is defined by a light source and an object plane.

As shown in FIG. 2(a), the optical axis 19 of the illumination assembly 30 can be skewed in relationship with the optical axis 18 of the lens. The illumination assembly optical axis 19 is defined by a light source 50, such as the flash lamp 34, and an object plane. Further, as noted above the optical axis of the lens 18 can be varied with respect to the longitudinal axes 22, 24 of the first and second lens surfaces, depending on the requirements of a particular optical system in which the lens 10 is introduced.

Referring now to FIGS. 10–14, the illumination assembly 30 can be contained within the assemblage of a camera, such as a recyclable single use camera 100 having three major structural components; a main body or frame 102, a front cover 120 which is attached to the front of the body, and a rear cover 130 which is attached to the rear of the body.

Figure 10:
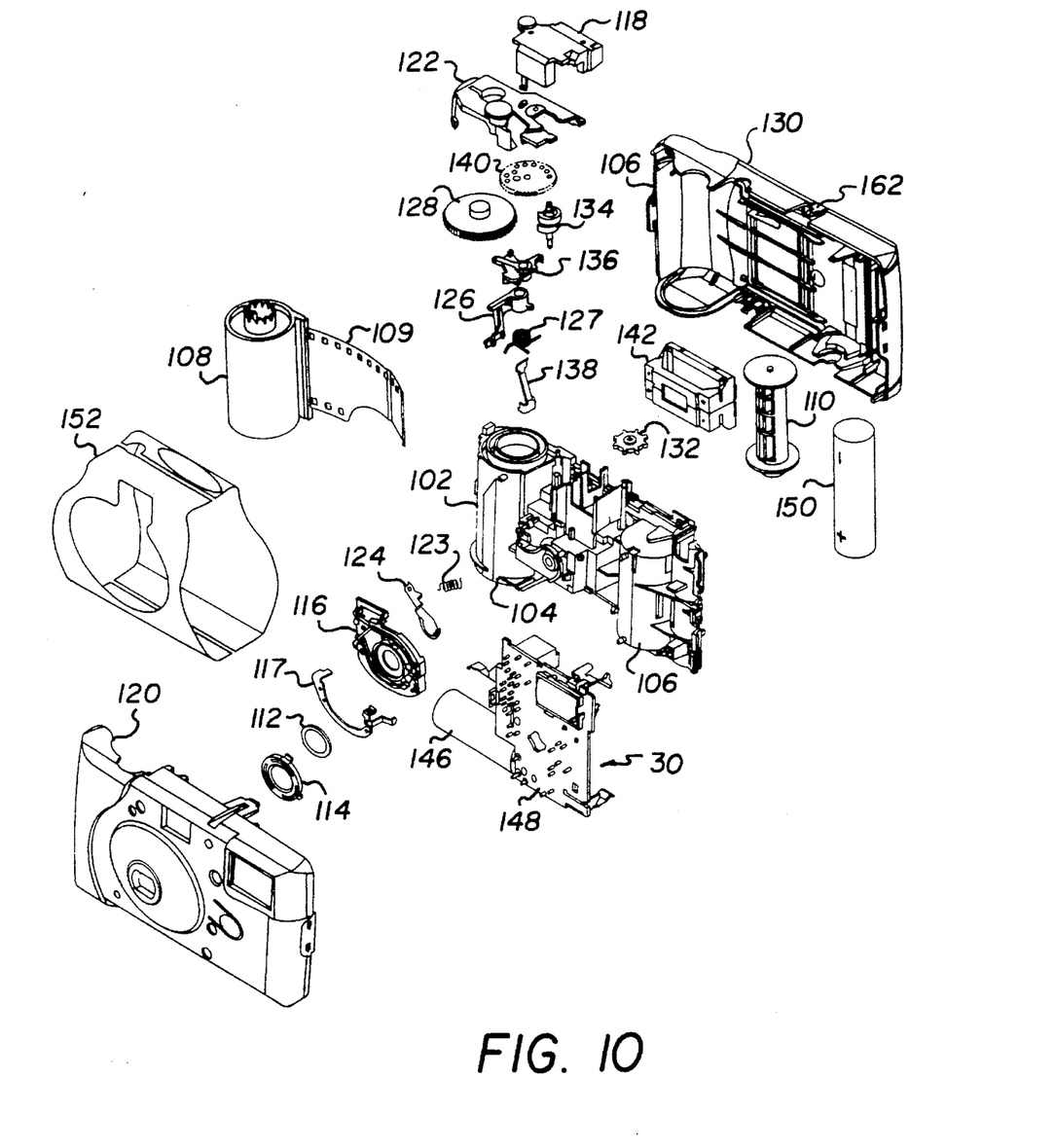
FIG. 10 is an exploded perspective view of a recyclable single use camera utilizing the illumination flash assembly of FIG. 3.
Figure 11:
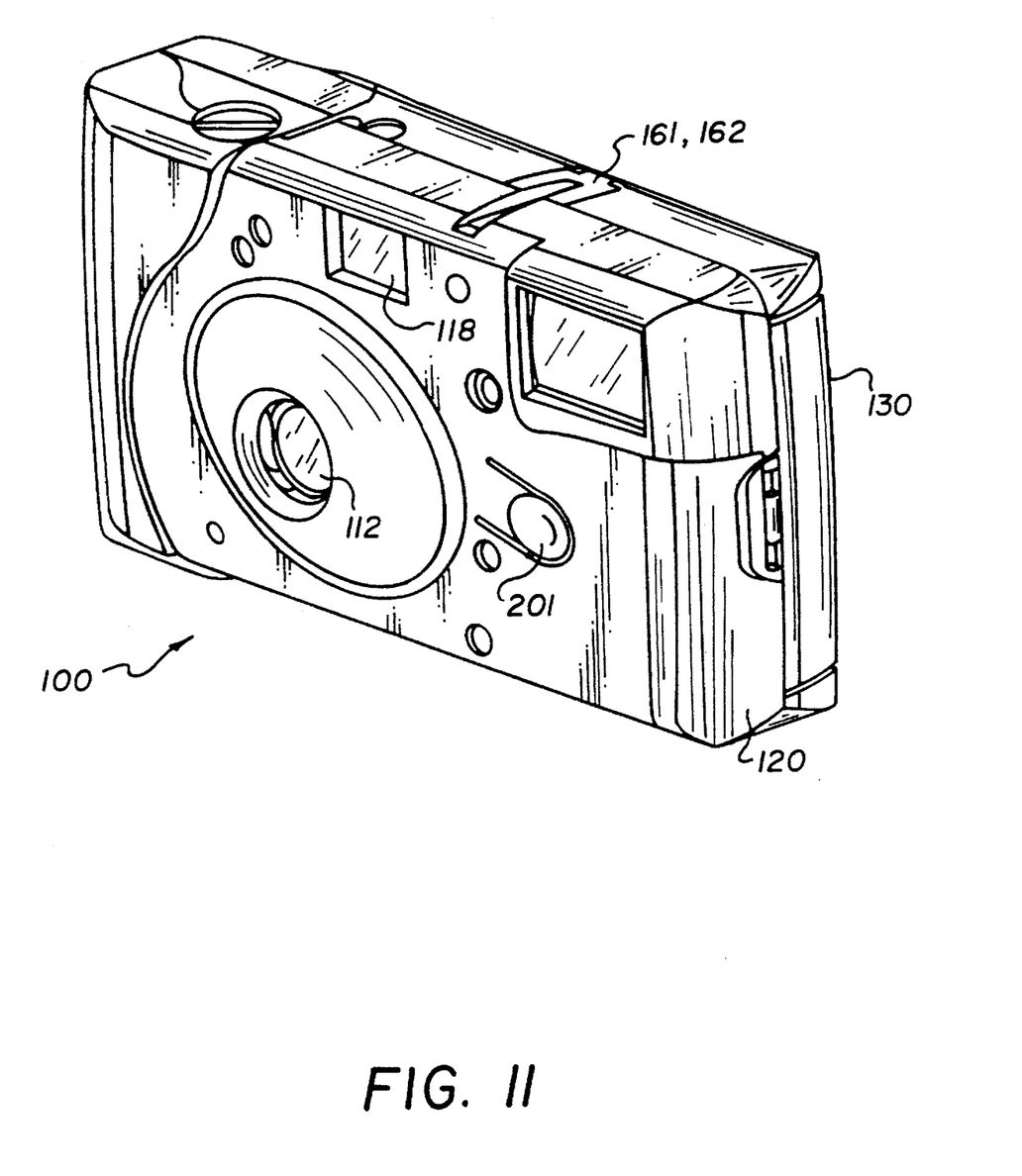
FIG. 11 is a front perspective view of the single use camera shown in FIG. 10.
Figure 12:
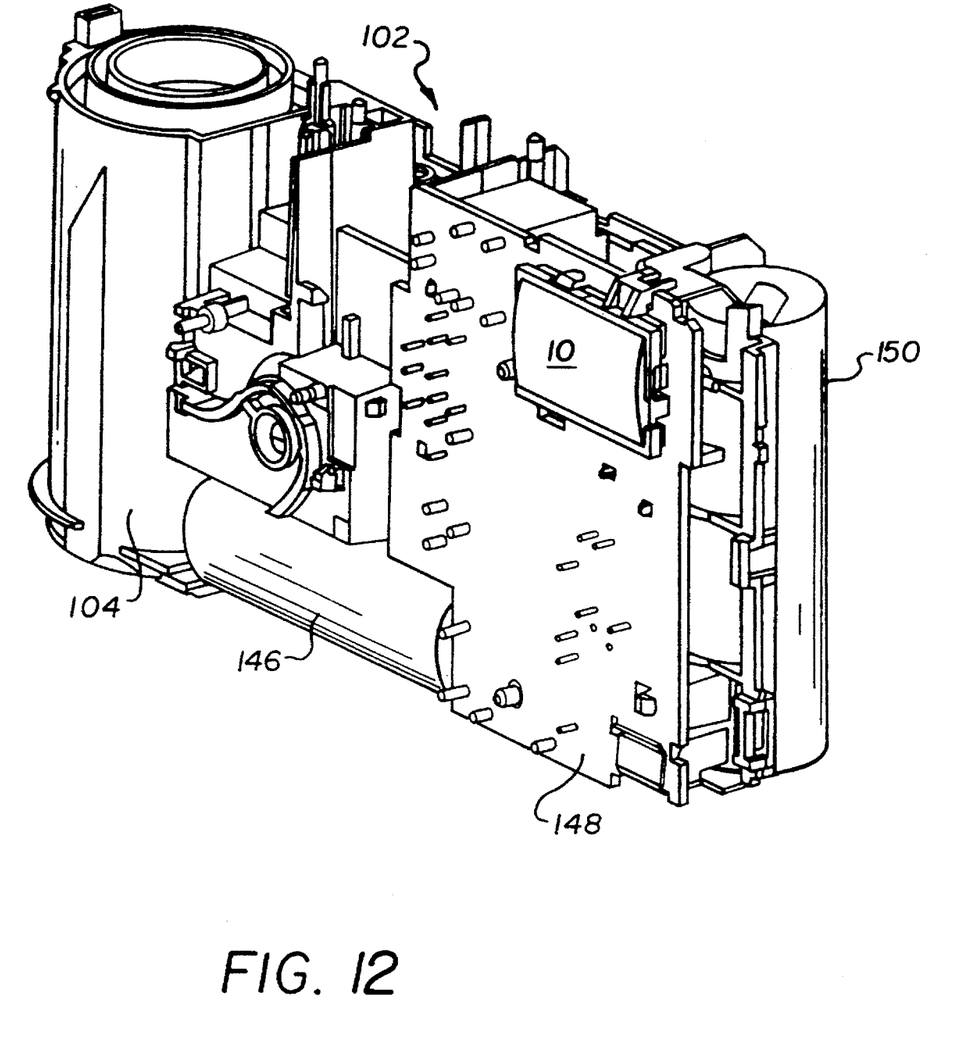
FIG. 12 is a partial front perspective view of the body of the single use camera shown in FIGS. 10 and 11.

Referring more specifically to the exploded view of the camera 100 shown in FIG. 10, the body 102 includes a pair of formed chambers 104, 106 for retaining a film cassette 108 and a take-up roll, such as spool 110, respectively. The pair of chambers 104, 106 are oppositely disposed relative to an exposure gate 107, FIG. 14. The body 102 additionally supports the following camera parts which are attached to the body prior to the attachment of the covers 120, 130: a taking lens 112 which is attached to the front of the body 102 by means of a retainer 114 and a support plate 116 sandwiching the lens therebetween, wherein the support plate has a contact switch 117; and a plastic viewfinder 118. The viewfinder 118 may be a one-piece viewfinder comprising a support and two optically aligned lenses, all of which may be molded together from a common material in a single molding process in accordance with the invention disclosed in commonly owned U.S. Pat. No. 5,353,165. The disclosure of this patent is incorporated by reference herein. Also attached to the body 102 is a shutter mechanism 119 consisting of a keeper plate 122 having a depressible shutter release portion for tripping a shutter blade 124, biased by a spring 123 via a high-energy lever 126, which is also biased by helical spring 127; a film advancing and metering mechanism consisting of a thumbwheel 129 which engages the spool (not shown) of the loaded film cassette 108, a sprocket 132 for engaging film perforations having a spring biased portion extending into a rotatable cam 134 which engages a metering lever 136 which is biased by means of a spring 138, the cam having an extending portion 138 for contacting a frame counter 140; a light baffle 142 which is mounted into the rear of the body 102 and into the exposure gate 107, FIG. 14, or alternatively integrally formed with the body 102; and the previously described flash illumination assembly 30 having the above-described anamorphic lens 10 and further including a capacitor 146, mounted on the back side of a circuit board 148 which is powered by a battery 150. The illumination assembly may include a single touch flashing charging and control circuit as disclosed in the commonly assigned, copending utility patent application referred to above, the disclosure of which is incorporated by reference herein. The illumination assembly is made operable, preferably according to the particular embodiment, by a one touch cantilevered portion 201 of the front cover 120, FIG. 11. The front cover 120 and the rear cover 130 are sandwiched and held together along with the body 102 by means discussed subsequently, to form an assembled camera. A decorative label 152 may be subsequently attached to the finished camera 100 to deter a user from opening the camera and provide a convenient place for product identification and operational information.

For a variety of reasons, including economic efficiency and environmental concerns, single use cameras, such as the described camera 100, are designed to be recycled by the manufacturer after a purchaser has completed exposing the loaded film and turned the camera over to a photofinisher for development of the film. See, for instance, U.S. Pat. No. 5,329,330 to Sakai, et al. Therefore, certain parts of the cameras are designed to last through a suitable number of cycles of sale, use, reconstruction, and resale. Conversely, for quality reasons, among others, certain parts should be replaced each time a camera is reconstructed. To successfully recycle cameras, it is important to know when particular reused camera parts should no longer be utilized because, for example, they have reached the end of their useful life. Thus, each time a camera is recycled, as described in detail below, a mark on the camera body and/or flash mechanism may be made in accordance with commonly owned U.S. Pat. No. 5,021,811 (the disclosure of which is incorporated by reference herein) to indicate the number of times it has been reconstructed.

Figure 13:
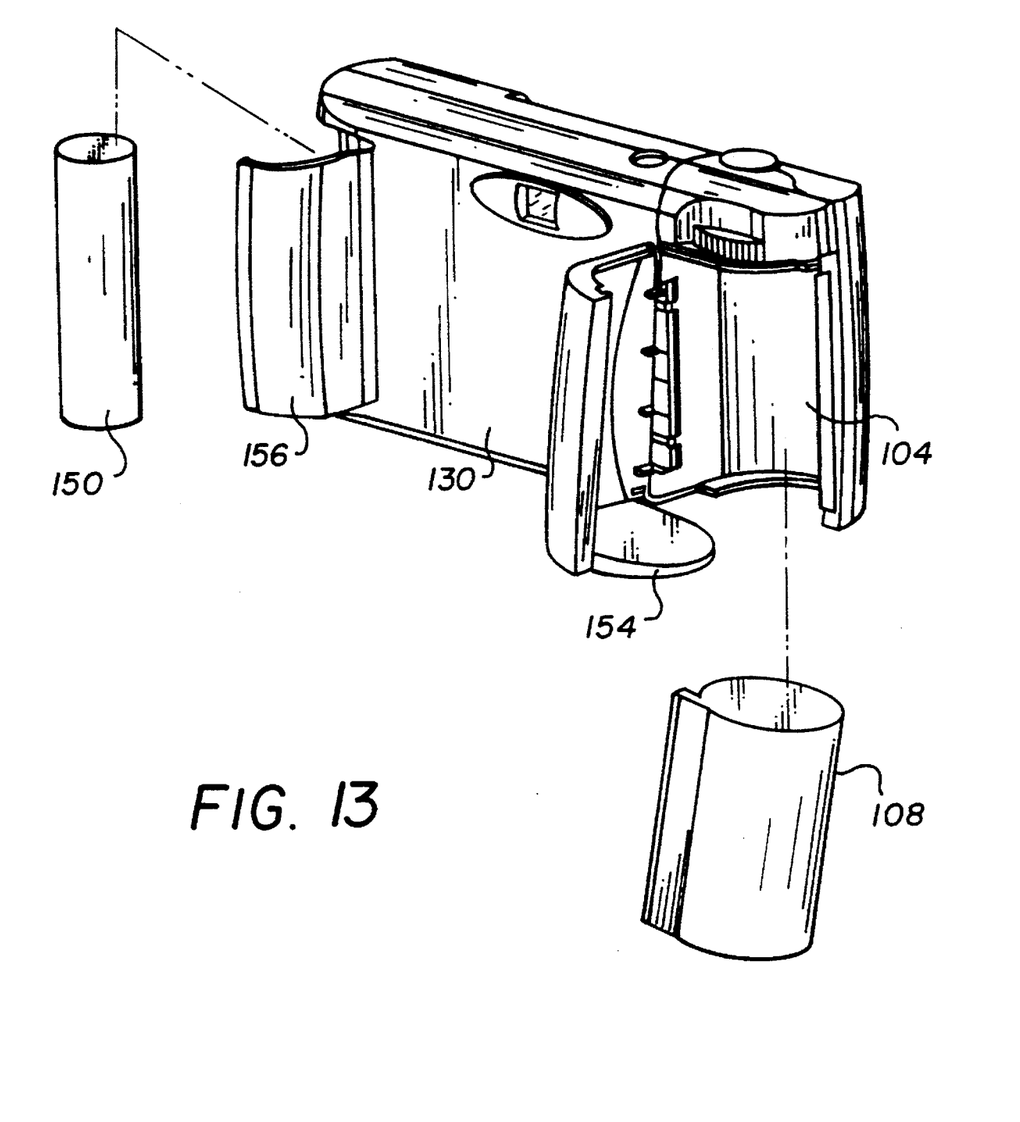
FIG. 13 is a partially exploded rear view of the camera shown in FIGS. 10–12.
Figure 14:
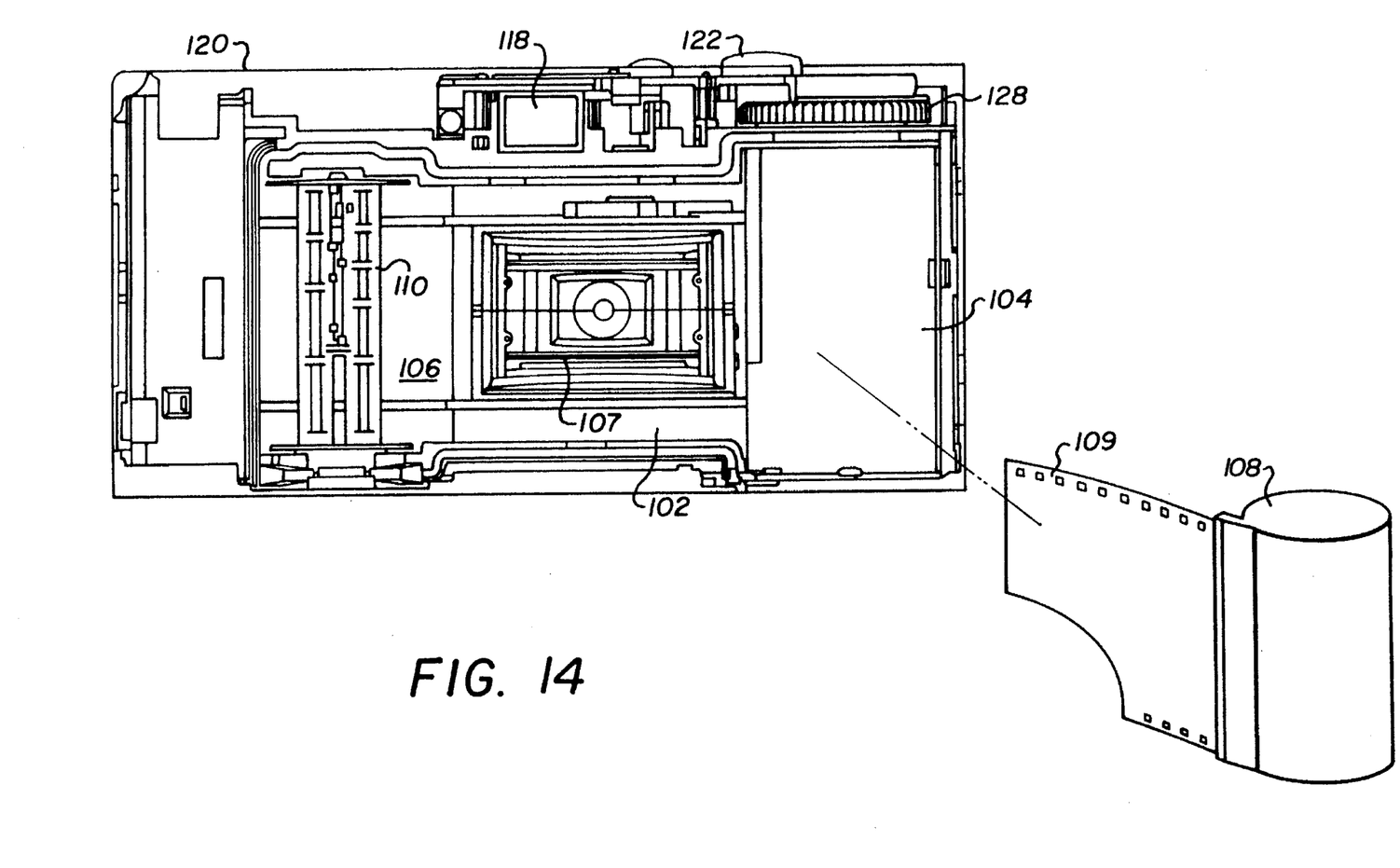
FIG. 14 is a partial rear view of the single use camera of FIG. 13 showing the reloading of a film cassette.

An efficient recycling program requires a number of competing concerns to be reconciled. In general, the manufacturer/recycler wants to facilitate easy access to the exposed film when removed by the photofinisher. This ensures that the reusable components are not damaged. On the other hand, access to the interior of the camera by the consumer/photographer is undesirable because it increases the risk of damage to and/or contamination of the interior of the camera and its reusable components. These considerations are resolved by the particular design of the door 154 provided on the rear cover, as shown in FIG. 13, to access the film chamber 104. To facilitate recycling without damage to the camera, the door 154 may be attached to the rear cover by a living or flexible hinge integrally formed as a groove or a reduced thickness portion of the cover. An example of a living hinge in a film cassette door for a single use camera is disclosed in commonly owned U.S. Pat. No. 5,255,041, the disclosure of which is incorporated by reference herein. Alternatively, the door 154 may be connected to the rear cover by a frangible connection integrally formed therewith and designed to break away from the remainder of the rear cover. In either case, the opening of the door 154 provides access to film cassette 108 without damaging or exposing the camera parts attached to the camera body 102. Similarly, a second door 156 can also be provided on the rear cover 130 to be flexibly opened or broken away by the photofinisher to remove the flash battery 150, if desired. See FIG. 13.

The camera 100 is then turned over to the manufacturer for recycling as will now be described with reference to the FIGS. 10–14. The recycling process may comprise the following steps: First, the front cover 120 and rear cover 130 may be detached from the camera body 102. It should be readily apparent that the covers 120, 130 and body 102 may utilize a number of means for attaching the structural parts together; for example, hook and/or press fitting members may be used, or the parts can be ultrasonically welded together. Thus, each cover may have a suitable number of conventional releasable hook structures (one of which is shown at 161, 162) or other attachment means for allowing removal of the covers from the body. The covers may be made from a recyclable plastic such as polystyrene and can be sent to be pulverized. The pulverized material may be blended with virgin materials and new covers or other parts molded therefrom.

The prewind spool 110, the taking lens 112, and light baffle 142 (unless integrally molded with the body 102) also are removed. The taking lens 112 also may be similarly pulverized with other lenses, blended with virgin materials, and new lenses made therefrom.

Other parts, typically more costly components designed to be reused, such as the main body 102 and the major parts supported by the body, e.g., the viewfinder 118, shutter mechanism 119, film advancing and metering mechanism, and flash illumination assembly 30, including the anamorphic lens 10, etc. may be examined carefully for wear or damage. Those parts deemed damaged or worn may be removed from the body 102 and replaced with new parts. Those remaining reusable parts, such as the camera flash assembly 30, shutter mechanism 119, etc., that can be reused remain supported by the camera body, for construction into a camera 100.

A new front cover 120 is then fitted to the front face of the body 102 and an unexposed roll of film 109 contained within a fresh cassette 108 is loaded into the film cartridge chamber 104. A leading portion of the film 109 contained with the cassette 108 is then engaged with the take up spool 110, housed within the body chamber 106, as is conventionally known. A new rear cover 130 is then snapped or otherwise attached onto the rear of the camera body 102 and/or to the front cover 120 by any of the attachment means discussed above.

A less rigorous but not preferred recycling process may be employed in which the covers 120, 130 are not replaced with new parts. In this case, the cameras would be inspected visually after the back cover is removed. If the camera was deemed reusable as a whole, a new film 109 then would be reloaded into the film chamber and threaded onto the take-up spool. The rear cover then would be re-attached to the camera body and/or front cover.

In either case, the film 109 may be then prewound onto the take-up spool 110, which is supported for rotation in chamber 106 so that the film is wound back into the cassette 108 as the film is being exposed. A limited torque electric screwdriver or other tool may be used to prewind the film onto the prewind spool. If a new take-up spool is not provided and if the exposed end of the prewind spool previously was deformed to prevent reuse of the spool for prewinding purposes, sufficient heat and/or pressure must be applied to rotate the spool.

At least one wind and trip check (film advance and shutter actuation) may be done to simulate taking a picture, thereby bringing the counter down to 24 (assuming a 24 exposure roll). The camera then may be inserted into a cardboard casing or a label such as 152 attached thereto by adhesive. The recycled camera then may be humidity sealed in a foil wrap, plastic bag or the like, and packaged in an outer cardboard box for sale. The recycled single use camera 100, utilizing previously used single use camera parts, such as the flash illumination assembly 30 with anamorphic lens 10, is now fully assembled and ready for consumer use.

The foregoing description of the invention is merely exemplary and minor changes and modifications to the invention as described are possible and wholly within the scope of the invention as set forth in the appended claims.

PARTS LIST FOR FIGS. 1–14

10 anamorphic lens
12 body of optical material
14 first surface
16 second surface
18 optical axis
19 illumination assembly optical axis
22 longitudinal axis
24 longitudinal axis
30 camera illumination assembly
32 reflector
33 open end
34 flash lamp
35 reflective surface
40 back wall
50 light source
100 single-use camera
102 body
104 film cassette chamber
106 take-up chamber
107 exposure gate
108 film cassette
109 film
110 take-up spool
112 taking lens
114 retainer
116 support plate
118 viewfinder
119 shutter mechanism
120 front cover
122 keeper plate
123 spring
124 shutter blade
126 high energy lever
127 helical spring
129 thumbwheel
130 rear cover
132 sprocket
134 rotatable cam
136 metering lever
138 spring
140 frame counter
142 baffle
146 capacitor
148 circuit board
150 battery
152 label
154 first door
156 second door
161 releasable hook structure
162 releasable hook structure
210 one touch cantilevered portion

I claim:

1. An anamorphic lens comprising a first and a second lens surface, each having a longitudinal axis in which the longitudinal axes of the first and second lens surfaces are crossed, is characterized in that:

at least one of said first and second lens surfaces is defined by an acylindrical curvature and the other lens surface is defined by a cylindrical or acylindrical curvature for providing independent illumination control at a target, said lens having a center zone and an edge zone, said lens surfaces each being continuously curved in said center and edge zones, at least one of said lens surfaces having a difference in curvature from said center zone to said side zone.

2. The lens of claim 1 in which the curvature of the first surface is convex.

3. The lens of claim 1 in which the curvature of the second surface is convex.

4. The lens of claim 1 in which the longitudinal axes of the lens surfaces intersect at an angle of between about 40 degrees to 140 degrees.

5. The lens of claim 4 in which the longitudinal axes of the lens surfaces are mutually orthogonal.

6. The lens of claim 1 in which the first surface and the second surface each have an f/# less than or equal to about f/5.

7. The lens of claim 1 having an optical axis in which the longitudinal axes of the first and second surfaces are orthogonal to the optical axis of the lens.

8. The lens of claim 1 including at least one acylindrical surface having a SAG Z defined by $$Z = \frac{CY^2}{1 + [1 - (K+1)C^2Y^2]^{1/2}} + A_2Y^2 + A_4Y^4 \ldots + A_nY^n$$

where
C=surface curvature at vertex;
K=the conic constant of the acylinder;
Y=distance out from the optical axis;
A=aspheric deformation constant; and the f/# of the acylindrical surface is less than or equal to about f/5.

9. The lens of claim 1 in which the first surface is cylindrical and has a radius of curvature equal to 60 mm., and the second surface is acylindrical and has a SAG Z defined by $$Z = \frac{CY^2}{1 + [1 - (K+1)C^2Y^2]^{1/2}} + A_2Y^2 + A_4Y^4 \ldots + A_nY^n$$

where
C=1/radius of curvature of second surface;
K=the conic constant of the acylinder;
Y=distance out from the optical axis;
A=aspheric deformation constant;
d=the diameter or height of the lens; and
C=−0.0555, −7≦K≦−3 (approximately) and d=12 mm.

10. The lens of claim 1 in which the first surface and the second surface are acylindrical.

11. The lens of claim 10 in which the first surface and the second surface each have an f/# less than or equal to about f/5.

12. The lens of claim 11 in which the longitudinal axes of the lens surfaces intersect at an angle of between about 40 degrees to 140 degrees.

13. The lens of claim 12 in which the longitudinal axes are mutually orthogonal.

14. An illumination assembly, comprising:
a non-planar, open reflector located along an optical axis of the illumination assembly;
flash illumination means; and
an anamorphic lens located at the opening of the reflector, said lens having first and a second lens surfaces, each said surface having a longitudinal axis, said axes being crossed, and at least one of said first and second lens surfaces being defined by an acylindrical curvature and the other lens surface being defined by a cylindrical or acylindrical lens curvature, said lens having a center zone and an edge zone, said lens surfaces each being continuously curved in said center and edge zones, at least one of said lens surfaces having a difference in curvature from said center zone to said edge zone.

15. The illumination assembly of claim 14 in which the optical axis of the lens and the optical axis of the assembly are coincident.

16. The illumination assembly of claim 14 in which the curvature of the first surface is convex.

17. The illumination assembly of claim 14 in which the curvature of the second surface is convex.

18. The illumination assembly of claim 14 in which the longitudinal axes of the lens surfaces intersect at an angle of between about 40 degrees to 140 degrees.

19. The illumination assembly of claim 17 in which the longitudinal axes of the lens surfaces are orthogonal to one another.

20. The illumination assembly of claim 14 wherein the longitudinal axes of the first and second surfaces are orthogonal to an optical axis of the lens.

21. The illumination assembly of claim 14 in which the first surface and the second surface each have an f/# less than or equal to about f/5.

22. The illumination assembly of claim 14 in which the lens includes at least one acylindrical surface having a SAG Z defined by $$Z = \frac{CY^2}{1 + [1 - (K+1)C^2Y^2]^{1/2}} + A_2Y^2 + A_4Y^4 \ldots + A_nY^n$$

where
C=surface curvature at vertex;
K=the conic constant of the acylinder;
Y=distance out from the optical axis;
A=aspheric deformation constant; and the f/# of the acylindrical surface is less than or equal to about f/5.

23. The illumination assembly of claim 14 in which the first surface is cylindrical and has a radius of curvature of 60 mm., and the second surface is acylindrical and has a SAG Z defined as $$Z = \frac{CY^2}{1 + [1 - (K+1)C^2Y^2]^{1/2}} + A_2Y^2 + A_4Y^4 \ldots + A_nY^n$$

where
C=1/radius of curvature of second surface;
K=the conic constant of the acylinder;
Y=distance out from the optical axis;
A=aspheric deformation constant;
d=the diameter or height of the lens; and in which:
C=−0.0555, −7≦K≦−3 (approximately) and d=12 mm.

24. The illumination assembly of claim 14 in which the first surface and the second surface are acylindrical.

25. The illumination assembly of claim 14 in which the first surface and the second surface each have an f/# less than or equal to about f/5.

26. The illumination assembly of claim 14 in which the longitudinal axes of the lens surfaces intersect at an angle of between about 40 degrees to 140 degrees.

27. The illumination assembly of claim 25 in which the longitudinal axes are mutually orthogonal.

28. The illumination assembly of claim 14 in which the longitudinal axes of the first and second surfaces are orthogonal to an optical axis of the lens.

29. A single use electronic flash camera made from previously used single use camera parts comprising:
a camera body having a film cassette chamber, said camera body supporting previously used single use camera parts including a flash device having a reflector at one end, an opening at another end, and an anamorphic lens mounted in said opening, said lens including means for providing independent illumination control in at least two directions; and
an unexposed roll of film mounted in the film cassette chamber of the camera body, wherein said anamorphic lens includes a first and a second lens surface, each surface having a longitudinal axis in which the axes are crossed and at least one of said first and second lens surfaces is defined by an acylindrical curvature and the other lens surface is defined by a cylindrical or acylindrical lens curvature, said lens having a center zone and an edge zone, said lens surfaces each being continuously curved in said center and edge zones, at least one of said lens surfaces having a difference in curvature from said center zone to said edge zone.

30. The single use camera of claim 29, wherein the camera body further comprises a take-up roll supported for rotation within the body, and the film is prewound onto the take-up roll.

31. The single use camera of claim 30, wherein said camera body further supports at least one previously used single use camera part selected from the group consisting of a viewfinder, taking lens, shutter mechanism, and film advance and metering mechanism.

32. A method of making a single use camera with an electronic flash from previously used single use camera parts comprising the steps of:
providing a previously used camera body having a film cassette chamber;
supporting in the camera body previously used single use camera parts including a flash device having a reflector with a light source at one end, an opening at another end, and an anamorphic lens mounted in the opening, with the lens including means for providing independent illumination control in at least two directions; and loading an unexposed roll of film into the film cassette chamber of the camera body, wherein said anamorphic lens includes a first and a second lens surface, each surface having a longitudinal axis in which the axes are crossed and at least one of said first and second lens surfaces is defined by an acylindrical curvature and the other lens surface is defined by a cylindrical or acylindrical lens curvature, said lens having a center zone and an edge zone, said lens surfaces each being continuously curved in said center and edge zones, at least one of said lens surfaces having a difference in curvature from said center zone to said edge zone.

33. The method of claim 32 wherein the camera body includes a take-up roll supported for rotation within the body, and further comprising the step of prewinding the film onto the take-up roll.

34. The method of claim 33 wherein the take-up roll is a previously used part and the step of prewinding the film onto the take-up roll comprises using a tool to apply sufficient force to rotate the roll within the body.

35. The method of claim 32, further comprising the step of:

determining which, if any, of the previously used camera components must be replaced with new parts.

36. The method of claim 35, further comprising the steps of:

supporting the camera body within a previously used front cover and rear cover; and attaching a paper-based material around the covers.

37. The method of claim 32, wherein the single use camera includes a front cover and a rear cover surrounding the camera body and the step of providing a previously used camera body comprises removing at least one of the front and rear covers from the camera.

38. The method of claim 37, further comprising the steps of:

removing the take-up roll and taking lens from the previously used camera body and replacing them with corresponding new parts;

replacing, if necessary, previously used parts selected from the group consisting of the camera body, shutter mechanism, and film advance and metering mechanism with corresponding new parts; and attaching, as necessary, a new front cover and a new rear cover to the camera body.

39. The method of claim 38, further comprising the steps of:

performing at least one wind and trip check by advancing the unexposed roll of film and activating the shutter.

40. The method of claim 39, further composing the steps of:

attaching a paper-based material around the front and rear covers; and sealing the recycled camera in a bag to preserve the unexposed roll of film loaded therein.

* * * * *

UNITED STATES PATENT AND TRADEMARK OFFICE
CERTIFICATE OF CORRECTION

PATENT NO. : 5,615,394
DATED : March 25, 1997
INVENTOR(S) : Richard E. Albrecht

It is certified that error appears in the above-identified patent and that said Letters Patent is hereby corrected as shown below:

Column 10, Line 35  Delete "to said side zone." and insert --to said edge zone.--

Signed and Sealed this

Ninth Day of December, 1997

Attest:

BRUCE LEHMAN

Attesting Officer

Commissioner of Patents and Trademarks